(12) United States Patent
Kumbhalkar et al.

(10) Patent No.: US 11,878,296 B2
(45) Date of Patent: Jan. 23, 2024

(54) CATALYST SEPARATION PROCESS

(71) Applicant: Dow Global Technologies LLC, Midland, MI (US)

(72) Inventors: Mrunmayi Kumbhalkar, Midland, MI (US); Wu Chen, Lake Jackson, TX (US); Brian Murdoch, Midland, MI (US); Haifeng Shi, Manvel, TX (US); Lin Zhao, Pearland, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 17/781,950

(22) PCT Filed: Jan. 25, 2021

(86) PCT No.: PCT/US2021/014838
§ 371 (c)(1),
(2) Date: Jun. 2, 2022

(87) PCT Pub. No.: WO2021/154623
PCT Pub. Date: Aug. 5, 2021

(65) Prior Publication Data
US 2023/0019789 A1 Jan. 19, 2023

Related U.S. Application Data

(60) Provisional application No. 62/968,224, filed on Jan. 31, 2020.

(51) Int. Cl.
*B01J 38/72* (2006.01)
*B01J 27/26* (2006.01)
*B01J 27/28* (2006.01)

(52) U.S. Cl.
CPC .............. *B01J 38/72* (2013.01); *B01J 27/26* (2013.01); *B01J 27/28* (2013.01)

(58) Field of Classification Search
CPC ... B01J 38/72; B01J 38/48; B01J 27/26; B01J 27/28
USPC .......... 502/21, 175; 210/767, 768, 772, 787, 210/788
See application file for complete search history.

(56) References Cited

U.S. PATENT DOCUMENTS 2,303,680 A * 12/1942 Brueckmann .......... C10G 11/18
208/162
5,158,922 A * 10/1992 Hinney .............. C08G 65/2663
502/200
5,318,500 A 6/1994 Kelley et al.
(Continued)

FOREIGN PATENT DOCUMENTS

CN    107252740 A    10/2017
JP    03245846 A *  11/1991  .............. B01J 31/18
(Continued)

*Primary Examiner* — Patricia L. Hailey

(57) ABSTRACT

A process for separating a catalyst component from a catalyst-containing slurry by centrifugation including separating the catalyst component from the mother liquor of the catalyst-containing slurry using a stacked disc centrifuge equipped with an auto-discharging functionality. The solids discharge from the stacked disc centrifuge is enhanced by adding a washing solution to the bowl and the solids discharge chute of the stacked disc centrifuge.

10 Claims, 3 Drawing Sheets

(56) References Cited

U.S. PATENT DOCUMENTS

| | | | | |
|---|---|---|---|---|
| 5,482,908 A | * | 1/1996 | Le-Khac | C08G 65/30 |
| | | | | 502/154 |
| 5,688,861 A | * | 11/1997 | Simroth | C08G 18/409 |
| | | | | 524/762 |
| 5,891,818 A | | 4/1999 | Soltani-Ahmadi | |
| 5,900,384 A | * | 5/1999 | Soltani-Ahmadi | ............ |
| | | | | B01J 37/0236 |
| | | | | 502/200 |
| 2002/0177523 A1 | * | 11/2002 | Kim | C08G 65/2663 |
| | | | | 502/200 |
| 2003/0158449 A1 | * | 8/2003 | Hofmann | B01J 27/26 |
| | | | | 568/675 |
| 2015/0191660 A1 | | 7/2015 | Englund | |
| 2021/0308657 A1 | * | 10/2021 | Hofmann | B01J 37/0009 |

FOREIGN PATENT DOCUMENTS

| | | | | |
|---|---|---|---|---|
| KR | 1241429 B1 | 3/2013 | | |
| WO | WO-2020030617 A1 | * | 2/2020 | B01J 27/26 |

* cited by examiner

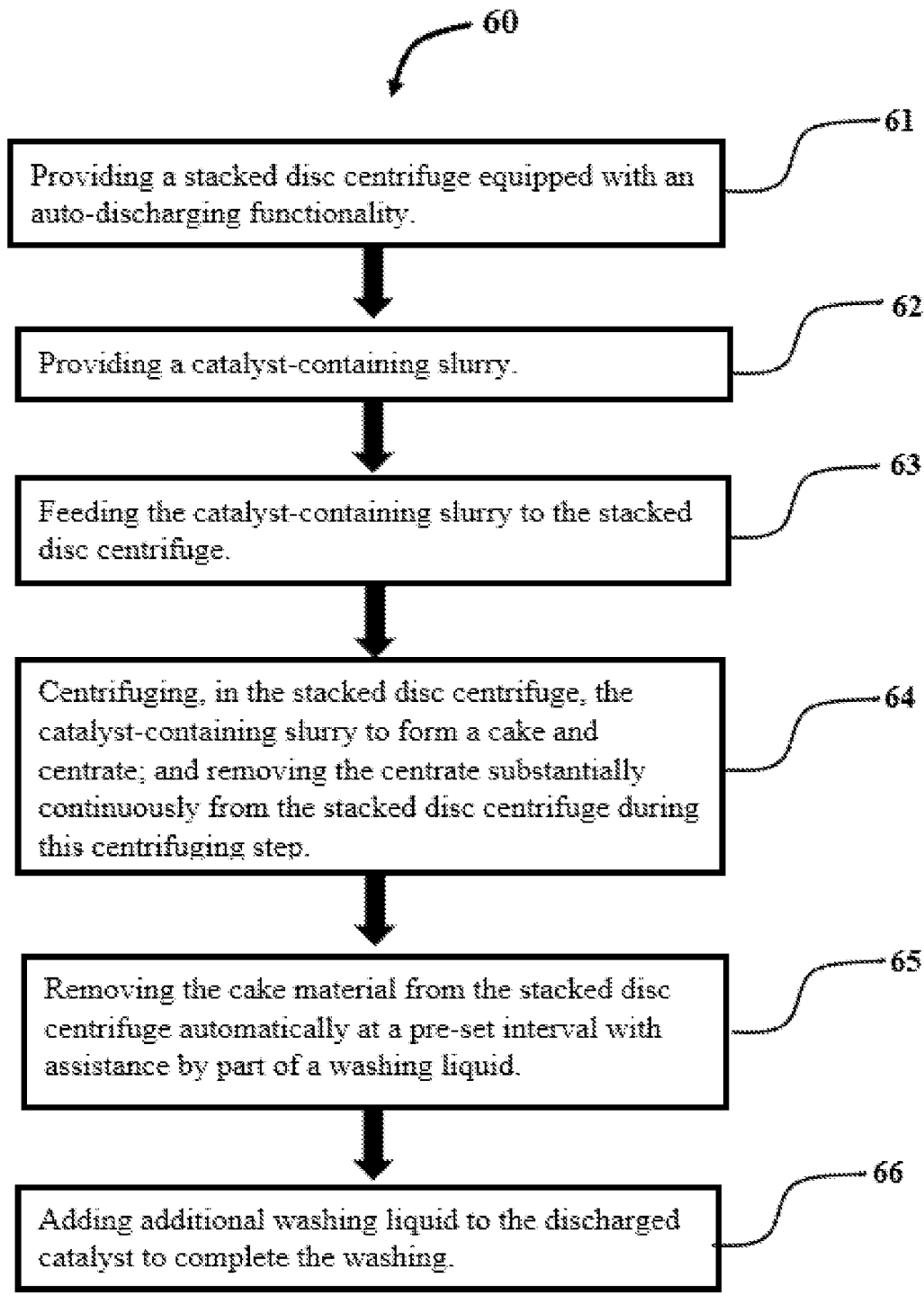

CATALYST SEPARATION PROCESS

FIELD

The present invention relates to a process for separating and washing a catalyst from mother liquor using a stacked disc centrifuge equipped with an auto-discharging functionality.

INTRODUCTION

The type of centrifuge most commonly known in the prior art and used to carry out separation of a difficult to filter catalyst from mother liquor is a laboratory scale spin tube centrifuge. The problem with the prior art process of separating such as difficult to filter catalyst from mother liquor using a laboratory scale spin tube centrifuge is that the capacity of a spin tube is limited to a few liters at most and the resultant separated catalyst needs to be removed manually which further limits the processing capacity. This results in a longer separation time per gram of material. For example, the separation time per gram of material is lowered by at least a factor of two by using a lab-scale disc centrifuge instead of a spin tube centrifuge in this application. In addition, the laboratory scale spin tube centrifuge is not feasible to use on a pilot plant scale and a commercial plant scale. Thus, there is a need for a centrifugation process for catalyst separation from mother liquor where the time to separate the catalyst, particularly nonfilterable or difficult to filter catalysts, from the mother liquor is reduced and to make the process feasible to use on a pilot scale and/or a commercial scale. Based on the particle size of the catalyst, especially when the catalyst is of a size smaller than 5 microns, conventional filtration techniques such as vacuum and pressure filtrations cannot be used because the flux through a filter medium is very low due to the high resistance of the deposited cake.

Heretofore, there have been very few revelations in the prior art related to catalysts and centrifuges. In an article by Laning, Steven J., "Chemical Interesterification of Palm, Palm Kernel and Coconut Oils", J. Am. Oil Chem. SOC., 1985, 62(2), 400-404; a general statement is made related to a catalyst being neutralized with water and then passing the catalyst on to a centrifugal separation operation and a drying operation.

In another article by Inoue, T., Gunjishima, I., Okamoto, A., "Synthesis of Diameter-Controlled Carbon Nanotubes Using Centrifugally Classified Nanoparticle Catalysts", Carbon, 2007, 45 2164-2170; the use of a centrifuge is briefly mentioned for the synthesis of carbon nanotubes.

In the above two articles, the types of centrifuge used were not disclosed; however, a common and well-known centrifuge used at the time of the above two articles and for the type of separations described in the above references is the aforementioned laboratory spin tube centrifuge. For example, CN107252740A discloses a centrifuge for processing building coating catalyst wherein the centrifuge is a laboratory scale spin tube centrifuge. CN107252740A does not disclose the use of a pilot scale or an industrial (commercial) production scale centrifuge.

In an article by Fayyazi et al., "Optimization of Biodiesel Production Over Chicken Egg Shell Derived CaO Catalyst in a Continuous Centrifugal Contactor Separator", Ind. Eng. Chem. Res. 2018, 57, 12742-12755; a continuous centrifugal contactor separator for a heterogeneous catalyzed liquid-liquid reaction is mentioned. In this case, the separation objective involves separating one liquid phase from another liquid phase and no solid particles are involved. In addition, such centrifugal contactor separator disclosed in the above article is a type of equipment/technology different from a centrifuge.

KR1241429B1 discloses a method of manufacturing an electrode catalyst for use in fuel cells where the method is suitable for mass production of the catalyst by applying post-catalyst manufacturing process steps including a centrifuge step and a washing step. The above reference does not specify the type of centrifuge used. However, in page 7, line [0037] of KR1241429B, there is mention of the use of a continuous centrifuge at 3,000 G-force to 150,000 G-force and a 40 L/hr water washing step. From the vague description of the centrifuge in the KR1241429B, the skilled artisan can surmise that the centrifuge used in the above reference process relates to a tubular type centrifuge (e.g., a centrifuge used for nuclear isotope separation) which is very different from the disc centrifuge, and although the liquid discharge is continuous, the solids removal is manual operation.

As illustrated above, heretofore various catalysts, centrifugations, and washings have been used; and the type of centrifuge most commonly used is a laboratory spin tube centrifuge. However, while stacked disc centrifuges are commercially available for production scale use, the prior art does not focus specifically on a catalyst centrifuge separation process or the use of stacked disc centrifuges for catalyst separation. Therefore, it would be desirous to provide a process for catalyst separation using a stacked disc centrifuge.

SUMMARY

One embodiment of the present invention is directed to a process of separating a catalyst from mother liquor using a stacked disc centrifuge equipped with an auto-discharging functionality. The stacked disc centrifuge is capable of discharging isolated solids at well-defined intervals in a short time span (e.g., 0.1 s to 10 s) thereby avoiding manual catalyst retrieval and centrifuge cleaning. For example, in one preferred embodiment, a stacked disc centrifuge is used to separate a catalyst present in a slurry (e.g., a double metal cyanide [DMC] slurry) by providing the necessary centrifugal force (e.g., from 8,000 G to 15,000 G) and having an auto-discharging function. The stacked disc centrifuge is successfully used at the pilot scale and can be easily scaled up to production scales. The resultant centrate produced from the centrifugation using a stacked disc centrifuge is visibly clear with a total suspended solids content of <0.2 wt %. The entire amount of slurry can be processed without opening the centrifuge bowl of the stacked disc centrifuge, thereby enabling a substantially continuous operation.

Another embodiment of the present invention is directed to a process of separating fine catalyst particles (e.g., <5 μm size particles) from a slurry using a stacked disc centrifuge and then washing fine catalyst particles. In this embodiment, the process includes the step of injecting a small quantity (e.g., <0.5 L to 1 L) of a washing liquid into the centrifuge to make the cake easier to be discharged. It is well known that catalyst solids remaining in a centrifuge, after centrifugation, are mixed with residue liquid and form a thick paste which is difficult to flow and be discharged from the centrifuge. The present invention process beneficially improves the ability of the thick paste to be discharged from the centrifuge.

BRIEF DESCRIPTION OF THE DRAWINGS

FIG. 3 is a schematic flow chart of the process of the present invention.

DETAILED DESCRIPTION

Figure 1:
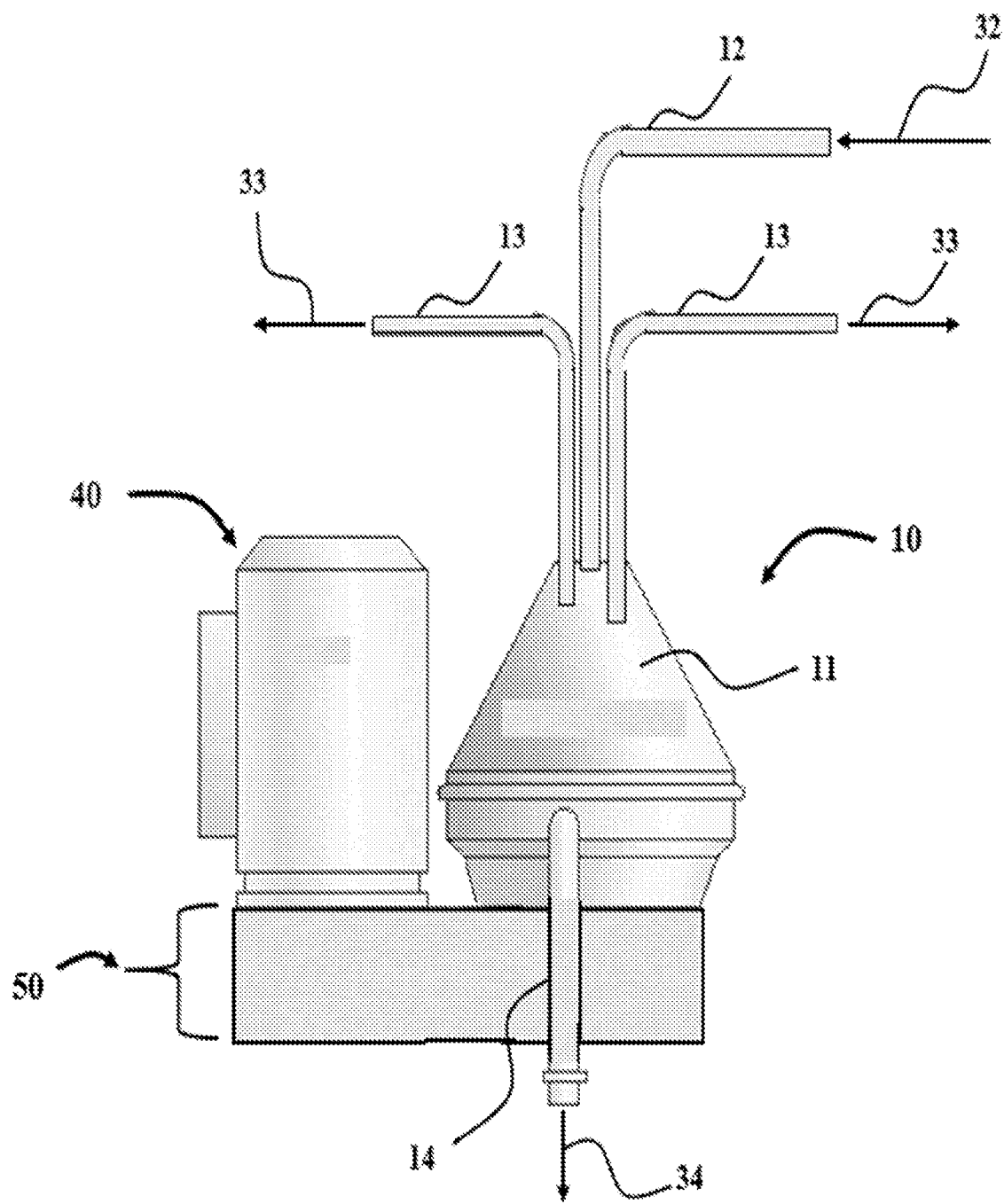
FIG. 1 is a schematic a perspective view of a stacked disc centrifuge.

"Slurry" herein means a mixture of catalyst solid particles and a solvent liquid "Automatic solids discharge function" herein means a timer-controlled operation resulting in discharge of wet cake containing catalyst solids from the stacked disc bowl.

"Centrate" herein means the liquid leaving the stacked disc bowl after most of the catalyst solid particles are removed.

"Wet cake" herein means a cake comprising mostly of catalyst solids and some mother liquor or solvent.

"Mother liquor" herein means the solvent mixture used in the catalyst synthesis step. This is the part of solution left over after catalyst particles have precipitated.

"De-sludge" and "de-sludging(s)" herein mean discharging the catalyst solids cake from a stacked disc bowl.

As used throughout this specification, the abbreviations given below have the following meanings, unless the context clearly indicates otherwise: "=" means "equal to"; @ means "at"; "<" means "less than"; ">" means "greater than"; "≥" means "greater than or equal to"; "≤" means "less than or equal to"; g=gram(s); mg=milligram(s); kg=kilograms; L=liter(s); mL=milliliter(s); L/hr=liter(s) per hour; mL/min=milliliter(s) per minute; $M_W$=molecular weight by weight; m=meter(s); m³/hr=cubic meters per hour; $M_N$=number average molecular weight; $M_w/M_n$=molecular weight distribution; μm=microns; pL=microliters; mm=millimeter(s); cm=centimeter(s); min=minute(s); s=second(s); hr=hour(s); ° C.=degree(s) Celsius; mPa·s=millipascals-seconds; psig=pounds per square inch gauge; kPa=kilopascals; G-force=multitude of gravitational force; %=percent; vol %=volume percent; and wt %=weight percent.

All percentages stated herein are weight percentages (wt %), unless otherwise indicated.

Temperatures are in degrees Celsius (° C.), and "ambient temperature" means between 20° C. and 25° C., unless specified otherwise.

In a broad embodiment, the present invention provides a process of extracting a catalyst component from a catalyst-containing suspension or slurry by separating the catalyst component (solid phase) from mother liquor or solvent of the slurry (liquid phase) using a stacked disc centrifuge equipped with auto-discharging functionality. The catalyst-containing suspension or slurry (herein "catalyst slurry") includes a mixture of: (a) at least one catalyst compound; (b) at least one liquid component, and (c) may contain one or more dissolved or undissolved components. For example, in one embodiment, the catalyst present in the catalyst slurry can be a single catalyst or a combination of two or more catalysts; and the liquid component present in the catalyst slurry can be one or more liquid components. In a preferred embodiment, the liquid component is an aqueous solution. Optional components can also be added to the catalyst slurry if desired.

Any catalyst that has a higher specific gravity than the mother liquid used in combination with the catalyst can be used in the present invention. For example, the catalyst present in the catalyst slurry can include one or more different catalyst compounds including for example double metal cyanide (DMC), multi-metal cyanide, aluminum compounds, and mixtures thereof. In one preferred embodiment, the catalyst compound present in the catalyst slurry can include a DMC catalyst.

Examples of useful aluminum compounds include trialkyl aluminum compounds such as trimethylaluminum, triethyl aluminum, tributyl aluminum, tribenzylaluminum and the like; aluminum alkoxides such as aluminum trimethoxide, aluminum triethoxide, aluminum triisopropoxide, aluminum tri-t-butoxide, aluminum tri-sec-butoxide and the like; aluminum aryloxides such as aluminum phenoxide and aluminum phenoxides in which one or more of the phenoxide groups is ring-substituted with one or more of alkyl, $CF_3$, cyano, $COCH_3$, halogen, hydroxyl, alkoxyl and the like; aluminum oxide; aluminum carboxylates such as aluminum formate, aluminum acetate, aluminum propionate, aluminum 2-ethylhexanoate, aluminum benzoate, aluminum benzoates in which one or more of the benzoate groups is ring-substituted with one or more of alkyl, $CF_3$, cyano, $COCH_3$, halogen, hydroxyl, alkoxyl and the like, aluminum salicylate, aluminum 3,5-di-t-butyl salicylate; aluminum amides such as aluminum tris(dimethylamide), aluminum tris(diethylamide), aluminum tris(diphenylamide), aluminum tris(di(trimethylsilyl)amide) and the like; aluminum acetylacetonate; aluminum t-butylacetylacetonate; and alkylaluminum oxides and alkoxides such as diethylaluminum ethoxide, dimethylaluminum ethoxide, diethylaluminum isopropoxide, dimethylaluminum isopropoxide, methyl aluminoxane, tetraethyldialuminoxane and the like.

The amount of catalyst compound present in the catalyst slurry of the present invention can be, for example, from 0.01 wt % to 15 wt % in one embodiment, from 0.5 wt % to 10 wt % in another embodiment, and from 1 wt % to 6 wt % in still another embodiment. Higher than 15 wt % catalyst solids can result in (1) a faster accumulation of solids in the stacked disc bowl than the bowl can discharge; and (2) a high loss of solids to the centrate, both results are undesirable.

The liquid component present in the catalyst slurry of the present invention can include one or more liquid compounds including for example water, t-butanol, 2-butanol, and polyether polyols, and mixtures thereof. The liquid component present in the catalyst slurry can be a single aqueous phase component, biphasic system, or system containing an organic phase component, and mixtures thereof as long as the catalyst has a higher specific gravity than the liquid component used in the present invention.

In one preferred embodiment, the liquid compound, other than water, can include commercially available compounds such as VORANOL™ P 4000 (a 4,000 $M_W$ polyether polyol, herein "P 4000") (available from The Dow Chemical Company); and mixtures of P 4000 with other liquid compounds.

The amount of liquid compound present in the slurry of the present invention can be, for example, from 85 wt % to 99.99 wt % in one embodiment, from 90 wt % to 99.5 wt % in another embodiment and from 94 wt % to 99 wt % in still another embodiment.

In addition to the above components (a) and (b) of the slurry, the slurry may also include other additional optional compounds, additives, agents or components (c); and such optional compounds may be added to the slurry mixture in combination with any one of the components (a) or (b) or with both components (a) and (b); or the optional component can be added as a separate addition. The optional additives or agents that can be used in the present invention can include one or more optional compounds known in the art for their use or function. For example, the optional additives, agents, or components can include aluminum sec-butoxide, aluminum isopropoxide, aluminum oxide; and mixtures thereof.

The amount of optional compound used to add to the slurry mixture can be, for example, from 0 wt % to 5 wt % in one embodiment, from 0.01 wt % to 2 wt % in another embodiment and from 0.5 wt % to 1.0 wt % in still another embodiment.

In a manufacturing process for producing a catalyst, typically the resultant product formed is a catalyst-containing slurry wherein undissolved solid particles are present in a liquid phase. In general, the process of the present invention includes adding to the catalyst-containing slurry other compounds such as water to form an aqueous catalyst slurry which can be subjected to a centrifugation process step. For example, components (a)-(c) are mixed together, to form the slurry which is then introduced into a centrifuge. For example, the ingredients that make up the catalyst slurry composition may be mixed together by any known mixing process and equipment. The order of mixing of the ingredients is not critical and two or more compounds can be mixed together followed by addition of the remaining ingredients. The mixing of the components can be carried out at a temperature of from 10° C. to 80° C. in one embodiment; from 15° C. to 60° C. in another embodiment; and from 20° C. to 40° C. in still another embodiment.

As one illustration of the present invention, and not to be limited thereby, a DMC catalyst slurry can be prepared by mixing an aqueous zinc chloride solution and a solution containing potassium hexacyanocobaltate (KHCC), tert-butanol (t-BuOH), and water to form a mixture in a reactor vessel. Then a propylene oxide polyol can be added to the mixture in the reactor vessel. The process temperature in the reactor vessel can be controlled at a desired temperature such as at 30° C. The resultant mixture formed is a DMC catalyst slurry.

One of the advantageous properties exhibited by the resulting catalyst slurry produced according to the above described process, can include, for example, the slurry is pumpable and can be pumped using conventional pumps without any special equipment or process conditions.

In a general embodiment, the centrifugation process of the present invention for processing a catalyst slurry and separating the catalyst from the mother liquor of the slurry includes using a stacked disc centrifuge equipped with an auto-discharging functionality. The stacked disc centrifuge (also known as a "disc-bowl centrifuge") used in the present invention is described in, for example, Perry's Chemical Engineers' Handbook and can be any disc-bowl centrifuge that is known in the centrifuge industry.

With reference to FIG. 1, there is shown a stacked disc centrifuge, generally indicated by reference numeral 10. The centrifuge 10 is operationally connected to a motor, generally indicated by reference numeral 40; and both pieces of equipment (centrifuge 10 and motor 40) are positioned on a base or platform, generally indicated by reference numeral 50. The centrifuge 10 includes a housing 11 for housing an internal rotating assembly, generally indicated by reference numeral 20, as shown in the cross-sectional view of FIG. 2. The centrifuge 10 also includes an inlet conduit 12 for introducing a feed of slurry 32 into the centrifuge 10; and the centrifuge 10 includes outlet conduits 13 for discharging a centrate flow 33 from the centrifuge 10. In addition, the centrifuge 10 includes an outlet conduit 14 for discharging a sludge flow 34 from the centrifuge 10.

Figure 2:
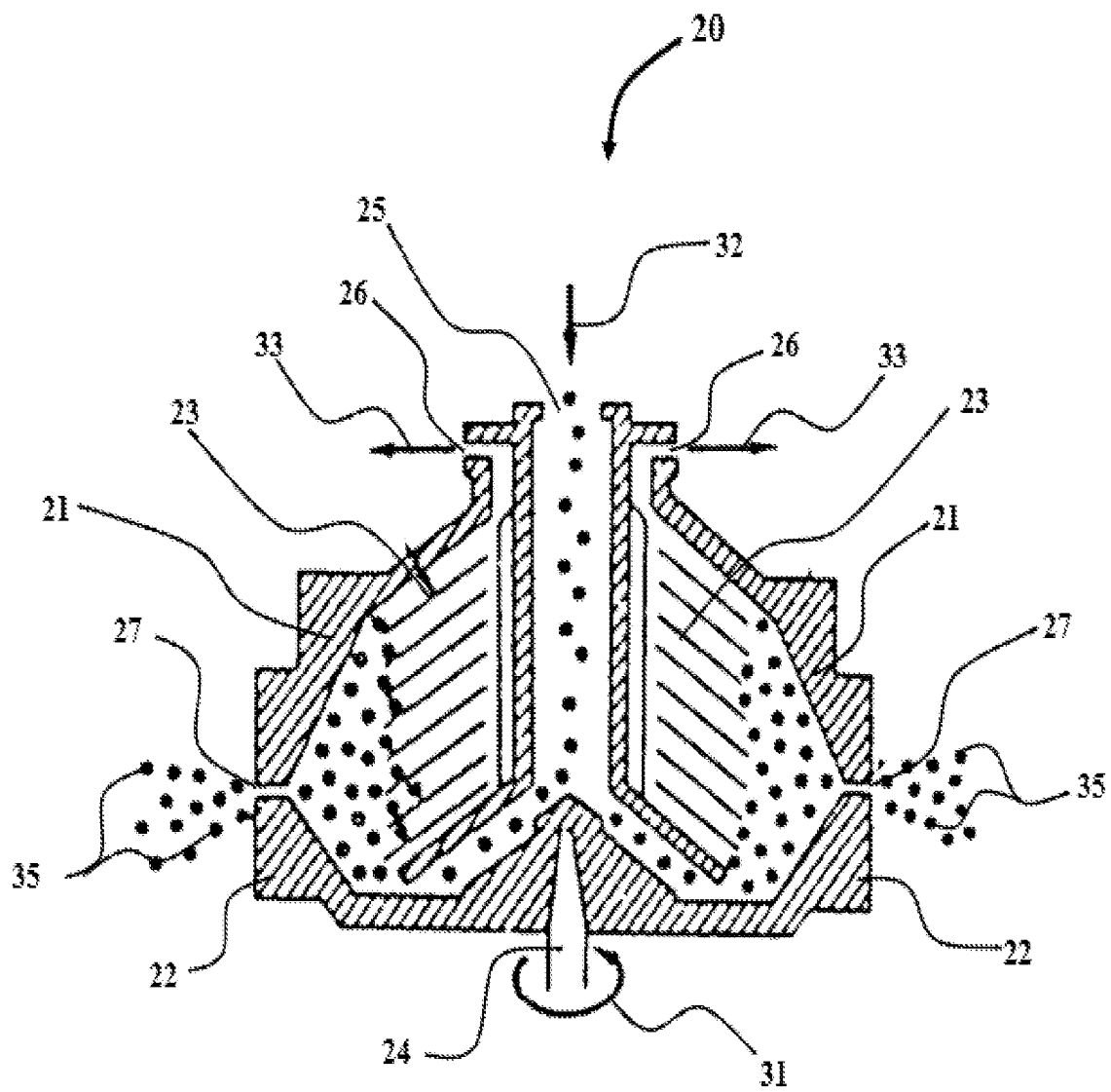
FIG. 2 is a cross-sectional view taken along line 2-2 of FIG. 1.

With reference to FIG. 2, there is shown a cross-sectional view of the internal elements of rotating assembly 20 housed by the housing 11 of the stacked disc centrifuge 10. The rotating assembly 20 includes, for example, an upper bowl body 21; a lower bowl body 22. and a plurality of disc members 23. Also, the rotating assembly 20 includes a rotatable shaft or rod 24 integral with the body 22 for rotating the centrifuge body 21, centrifuge body 22, and the disc members 23 in the direction shown by directional arrow 31.

With reference to FIG. 2 again, there is shown an opening or inlet 25, positioned in the upper body 21, for feeding a slurry 32 into the centrifuge 10 and rotating assembly 20; an exit or outlet 26, positioned in the upper body 21, for discharging a flow of centrate 33; an exit or outlet orifice 27, positioned toward the lower body 22, for discharging a sludge flow 35 which exits the rotating assembly 20 via orifice 27 and the centrifuge 10 via conduit 14 as the centrifuge 10 is in operation.

The stacked disc centrifuge 10 is able to apply a centrifugal force of 4,000 times G-force to 14,000 times G-force in one embodiment, from 5,000 times G-force to 12,000 times G-force in another embodiment, and from 6,000 times G-force to 10,000 times G-force in still another embodiment. Based on the above centrifugal force applied in the process, the separation time can be reduced significantly. For example, the total processing time of the process, which can include for example loading, separating, solid discharging and equipment cleaning, can be reduced by up to 50% in one embodiment, from 10% to 40% in another embodiment, and from 20% to 30% in still another embodiment.

The stacked disc centrifuge is ideally suited for separating particles from 0.05 µm to 100 µm in size in one general embodiment; from 0.1 µm to 50 µm in another embodiment; and from 0.5 µm to 10 µm in still another embodiment. The stacked disc centrifuge is also ideally suited for separating particles in concentrations of from 0.01 wt % to 15 wt % in one general embodiment; from 0.5 wt % to 10 wt % in another embodiment; and from 1 wt % to 6 wt % in still another embodiment.

The capacity of the stacked disc centrifuge useful in the present invention can depend on various factors such as the size of the disc bowl and how easy/difficult the particles can be separated. For example, as an illustration of the stacked disc centrifuge with an intermittent self-cleaning bowl in the present invention, and not to be limited thereby, the stacked disc centrifuge can be a Westfalia SA-1. This centrifuge, for example, has a maximum capacity of from 0.001 L/hr to 300 L/hr in one general embodiment; from 0.020 L/hr to 50 L/hr in another embodiment; and from 0.030 L/hr to 0.2 L/hr in still another embodiment. In other embodiments, different centrifuge models have different capacities.

As aforementioned, the stacked disc centrifuge used in the present invention is equipped with an automatic solids discharge function to separate catalyst solids from the mother liquor of a slurry. With reference to FIG. 3, for example, there is shown a schematic flow diagram of one broad embodiment of the catalyst separation process of the present invention, generally indicated by reference numeral 60, including the following steps:

Step (a): Providing a stacked disc centrifuge equipped with an automatic solids discharge function as indicated by numeral 61.

Step (b): Providing a catalyst-containing slurry as indicated by numeral 62.

Step (c): Feeding the catalyst-containing slurry to the stacked disc centrifuge as indicated by numeral 63.

Step (d): Centrifuging, in the stacked disc centrifuge, the catalyst-containing slurry to form a cake and centrate; and removing the centrate substantially continuously from the stacked disc centrifuge during this centrifuging step as indicated by numeral 64.

Step (e): Removing the cake material from the stacked disc centrifuge automatically at a pre-set interval with assistance by part of a washing liquid as indicated by numeral 65.

Step (f): Optionally, adding additional washing liquid to the discharged catalyst to complete the washing as indicated by numeral 66.

A preferred embodiment of the catalyst separation process of the present invention includes the following steps:

Step (1): Providing a stacked disc centrifuge equipped with an automatic solids discharge function. This step (1) can further include setting the operating parameters of the centrifuge of step (1), for example, by setting the feed and separation duration timer on the centrifuge control panel to a time period of from 10 min to 50 min; and setting the bowl open duration timer on the centrifuge control panel to a time period of from 0.1 s to 1.0 s.

The bowl opening/closing is hydraulically driven. For example, the operating water pressure line to the centrifuge is set at from 21 psig (144.8 kPa) to 36 psig (248.2 kPa).

Step (2): Providing a catalyst-containing slurry.

Step (3): Powering the centrifuge and allowing the centrifuge to reach its maximum bowl speed. For example, as an illustration of the stacked disc centrifuge useful in the present invention, and not to be limited thereby, the stacked disc centrifuge can be a SA-1 model. For the SA-1 model, the maximum speed of the centrifuge corresponds to a centrifugal force of, for example, 8,000 G; and the maximum speed of the centrifuge is reached in a time period of, for example, 300 s. In other embodiments, different centrifuge models have different max G-forces and different acceleration times.

Step (4): Feeding the slurry into the centrifuge, for example, by setting a slurry feed pump rate to a rate of from 1.2 L/hr to 12.0 L/hr. After the bowl is full, clear centrate is observed coming through the outlet line of the centrifuge and collected in a carboy. Total suspended solids analysis is performed on this centrate and the solids content is from 0.001 wt % to 0.02 wt %.

The centrifugation can be performed at temperature up to 170° C. in one embodiment, from 10° C. to 100° C. in another embodiment, and from 20° C. to 50° C. in still another embodiment. At centrifugation temperatures below 10° C., the liquid may become too viscous to flow; and at centrifugation temperatures above 170° C., the seal and motor which turns the centrifuge may not be able to sustain the heat and the motor could stop operating.

The wet cake obtained after separation is re-slurried in a wash solution containing at least water and any other liquid such as t-BuOH, and P 4000, to remove any undesired compounds. Generally, a typical catalyst synthesis process involves a total of three washings and four centrifugation steps. The re-slurring steps are carried at 20° C. to 40° C. and under an inert atmosphere.

Step (5): De-sludging the catalyst solids from the centrifuge after a time period of centrifugation. For example, after 10 min of centrifugation, the bowl of the centrifuge is opened for 0.5 s during which time, the catalyst solids are de-sludged (discharged) from the centrifuge into a receiver vessel. Step (5) de-sludging is carried out under an inert atmosphere at ambient temperature.

Step (6): Continuously running the pump and feeding the slurry to the centrifuge such that the separation is a substantially continuous operation. By "substantially continuous" it is meant that the bowl is open for a very short duration which results in discharge of the slurry that is being continuously fed but this is not a significant fraction (for example, in this application, less than 0.3% of total catalyst slurry). In one embodiment, to remove any excess solids stuck to the bowl, bowl wall and discharge chute, the next wash solution is used to rinse the bowl and discharge chute after a predetermined number of de-sludgings. For example, after from 5 to 10 number of de-sludgings.

Step (7): Collecting wet cake discharged from the centrifuge and washed further to remove the undesired compounds from the catalyst. The wet cake is collected at ambient temperature under inert atmosphere.

Step (8): Repeating the centrifugation and washing steps of steps (4) to (7) for a predetermined number of times, for example from 1 to 3 number of times, to form the final catalyst wet cake. The loss of catalyst solids in each centrate and cake discharge is described in Table I below. The loss is measured as percentage of total solids.

Some of the advantageous properties exhibited by the resulting catalyst solids separated according to the above described process, can include, for example: (1) active for propoxylation (2) active for ethoxylation, and (3) active for propoxylation and ethoxylation and any combination thereof.

The catalyst is the desired component of the present invention and the catalyst is separated from the centrate after the centrifuge process. The centrate produced by the process of the present invention can be either (1) directed to a flash distillation unit where the solvent mixture can be recovered or (2) sent to a waste handling facility. The recovered solvent can be re-used in the catalyst synthesis process and/or washing steps of the centrifugation process. For example, when the centrate contains t-BuOH, water, KCl, $ZnCl_2$, carried-over DMC particles, and mixtures thereof; if desired, the centrate can be distilled to remove the salts; and the resulting t-BuOH and water azeotrope can be recycled back to the DMC synthesis process and/or the azeotrope can be used to clean the stacked disc centrifuge.

EXAMPLES

The following Inventive Examples (Inv. Ex.) and Comparative Examples (Comp. Ex.) are presented to further illustrate the present invention in detail but are not to be construed as limiting the scope of the claims. Unless otherwise indicated, all parts and percentages are by weight.

General Procedure for Centrifugation of Catalyst Slurry

A 50 L batch of double metal cyanide (DMC) catalyst slurry, made up of DMC solids in a mother liquor of P4000, t-BuOH, and water, was processed in a stacked disc centrifuge equipped with an automatic solids discharge function to separate the DMC solids from the mother liquor. The process was run under an inert atmosphere ($N_2$). The wet cake obtained after separation is re-slurried, i.e. washed, with a wash solution containing t-BuOH, water, and P 4000 to remove undesired potassium in the wet cake product. The loss of solids content in the resultant centrate is measured and the centrate is discarded. The washed wet cake, the catalyst product, is then recovered. Optionally, the DMC synthesis process can be subjected to any number of washing and centrifugation steps. For example, in one preferred embodiment, the DMC synthesis procedure of the present invention includes a total of three washing steps and four centrifugation steps.

Example 1

A DMC slurry, described above, was subjected to a stacked disc centrifuge equipped with an automatic solids discharge function and the DMC solids were separated from the mother liquor using the following steps:

Step (1)—The bowl open timer and separation interval timer on the centrifuge control panel of the centrifuge unit were set to 0.5 s and 10 min, respectively. The bowl opening/closing of the centrifuge used is hydraulically driven; the operating water pressure line was at 25 psig (172.4 kPa). The centrifuge unit was powered and allowed to reach the maximum bowl speed. This speed corresponded to a centrifugal force of approximately 8,000 G.

Step (2)—The slurry feed pump rate was set to 9.0 L/hr. After the centrifuge bowl was full, clear centrate was observed coming through the outlet line and the centrate was collected in a carboy. Total suspended solids analysis was performed on this centrate. The loss of solids in the centrate is described in Table I.

Step (3)—After 10 min of centrifugation, the bowl opened for 0.5 s during which the DMC solids were de-sludged (discharged) from the centrifuge into a receiver vessel. The centrifuge bowl and solid discharge chute were rinsed with 1 L of wash solution described in Example 2 to assist removal of solids stuck to the bowl.

Step (4)—The resultant wet cake product from step (3) above was collected; and the loss of DMC solids in the centrate is described in Table I.

Example 2

The wet cake collected from the procedure of Example 1 was washed by re-slurring the wet cake with the same wash solution to remove any undesired potassium present in the DMC slurry. The wash solution (26.6 kg) contained t-BuOH (49.7 wt %), water (49.7 wt %), and P 4000 (0.6 wt %). The resulting DMC slurry after the above washing was then subjected to centrifugation using the same stacked disc centrifuge and the same steps (1)-(4) of Example 1. The loss of DMC solids in the centrate in this Example 2 is described in Table I.

Example 3

The wet cake collected from Example 2 was used in this Example 3; and the centrifugation and washing steps of Example 2 were repeated to obtain still another DMC wet cake. The wash solution (17.2 kg) contained t-BuOH (64.3 wt %), water (34.6 wt %), and P 4000 (1.0 wt %). The loss of solids in the centrate in this Example 3 is described in Table I.

Example 4

The wet cake collected from Example 3 was used in this Example 4; and the centrifugation and washing steps of Example 3 were repeated to obtain yet another DMC wet cake. The wash solution (13.8 kg) contained t-BuOH (98.0 wt %), water (1.4 wt %), and P 4000 (0.6 wt %). The loss of solids in the centrate is described in Table I.

TABLE I

| | DMC Catalyst Lost in Centrate (Starting Catalyst Amount = 1,000 g) | |
|---|---|---|
| Example No. | System | Catalyst Lost in Centrate (wt %) |
| Inv. Ex. 1 | After reaction forming the first slurry | 0.006 |
| Inv. Ex. 2 | After 1st wash of slurry | 0.003 |
| Inv. Ex. 3 | After 2nd wash of slurry | 0.010 |
| Inv. Ex. 4 | After 3rd wash of slurry | 0.014 |

In each of the above Examples, advantageously the slurry was continually fed into the centrifuge using the slurry feed pump to provide a separation process that was almost a continuous operation. In general, the process of the present invention has at least the following two benefits: (1) the centrifuge allows good catalyst recovery; and (2) the centrifuge allows short processing times. For example, the process time for isolating DMC solids using stacked disc centrifuge compared to spin tube centrifuge was reduced by up to 50%. The auto-discharging functionality along with washing of solid using rinse solutions showed reduction of the process discharge time from 2 hr to 10 s. The solids are lost in the centrate; and/or stuck to the centrifuge bowl, discharge chute, reactor walls, and agitator blades. The entire volume of DMC slurry shown in Examples 1-4 was processed in the manner described above and the results from the above Examples illustrate that less than 0.02 wt % solids are lost in the centrate and the overall catalyst recovery is approximately 92.5%.

What is claimed is:

1. A process for separating a fine catalyst component from a catalyst-containing slurry by separating the catalyst component from the mother liquor of the catalyst-containing slurry, the process comprising:
   (a) providing a stacked disc centrifuge equipped with an auto-discharging functionality;
   (b) providing a catalyst-containing slurry comprising a mixture of: (i) at least one catalyst compound that is a double metal cyanide; and (ii) at least one liquid component;
   (c) feeding the catalyst-containing slurry to the stacked disc centrifuge of step (a);
   (d) centrifuging, for a predetermined period of time, the catalyst-containing slurry to form a cake material of catalyst solids in the centrifuge and a centrate; wherein the centrate is removed substantially continuously from the centrifuge during this centrifuging step (d) and the catalyst solids content in the cake material is from 10 weight percent to 40 weight percent; and
   (e) removing the cake material from the centrifuge after the centrifugation of step (d).

2. The process of claim 1, further including:
   (f) washing the cake material of step (e) with a wash solution substantially simultaneously during the step (e) of removing the cake material from the centrifuge to remove any undesired components from the cake material.

3. The process of claim 2, wherein the washing step of step (f) is carried out using water, butanol, polyether polyol or mixtures thereof as the wash solution.

4. The process of claim 1, wherein the at least one liquid component is water.

5. The process of claim 1, wherein the feeding rate of the catalyst-containing slurry to the centrifuge is from 0.001 liters per hour to 300 liters per hour.

6. The process of claim 1, including further operating the centrifuge at a centrifugal force of from 6,000 G-force to 14,000 G-force.

7. The process of claim 1, including further discharging isolated solids from the centrifuge at predetermined intervals in a time period of from 5 minutes to 60 minutes.

8. The process of claim 1, wherein the resultant centrate produced from the centrifugation is visibly clear with a total suspended solids loss of from 0.005 weight percent to 0.2 weight percent.

9. The process of claim 1, further including:
(g) injecting a washing liquid into the centrifuge after the centrifugation step (d) and prior to removing step (e).

10. A catalyst product produced by the process of claim 1.

* * * * *